US011286041B2

(12) United States Patent
Hui et al.

(10) Patent No.: US 11,286,041 B2
(45) Date of Patent: Mar. 29, 2022

(54) AIRCRAFT WING ASSEMBLY

(71) Applicant: AIRBUS OPERATIONS LIMITED, Bristol (GB)

(72) Inventors: Ching-Yu Hui, Bristol (GB); Christopher Bauer, Bristol (GB)

(73) Assignee: Airbus Operations Limited, Bristol (GB)

( * ) Notice: Subject to any disclaimer, the term of this patent is extended or adjusted under 35 U.S.C. 154(b) by 348 days.

(21) Appl. No.: 16/466,896

(22) PCT Filed: Dec. 4, 2017

(86) PCT No.: PCT/EP2017/081422
§ 371 (c)(1),
(2) Date: Jun. 5, 2019

(87) PCT Pub. No.: WO2018/104251
PCT Pub. Date: Jun. 14, 2018

(65) Prior Publication Data

US 2019/0300158 A1 Oct. 3, 2019

(30) Foreign Application Priority Data

Dec. 7, 2016 (GB) ..................................... 1620836

(51) Int. Cl.
*B64C 21/02* (2006.01)
*B64C 3/48* (2006.01)
*B64C 9/22* (2006.01)

(52) U.S. Cl.
CPC ................ *B64C 21/02* (2013.01); *B64C 3/48* (2013.01); *B64C 9/22* (2013.01); *Y02T 50/10* (2013.01); *Y02T 50/30* (2013.01)

(58) Field of Classification Search
CPC ........... B64C 21/02; B64C 21/05; B64C 9/22; B64C 9/24; B64C 2230/20; B64C 21/06
See application file for complete search history.

(56) References Cited

U.S. PATENT DOCUMENTS 3,493,196 A 2/1970 McCall
4,398,688 A * 8/1983 Williams ................ B64C 21/04 244/207

(Continued)

FOREIGN PATENT DOCUMENTS

EP 1 019 283 9/2001
EP 1 919 772 5/2008

(Continued)

OTHER PUBLICATIONS

International Search Report and Written Opinion of the ISA for PCT/EP2017/081422 dated Feb. 1, 2018, 16 pages.

*Primary Examiner* — Richard R. Green
*Assistant Examiner* — Madison Elizabeth Dittner
(74) *Attorney, Agent, or Firm* — Nixon & Vanderhye P.C.

(57) ABSTRACT

An aircraft wing assembly including a main wing portion, a high-lift device with a flow surface including an upper skin portion and a lower skin portion, wherein the flow surface of the high-lift device comprises a first flow surface portion, a second flow surface portion and a third flow surface portion, wherein the first flow surface portion is micro-perforated for an air inflow, wherein the first flow surface portion extends on the upper skin from the leading edge in chordwise direction for 2% or less of the local chord and extends on the lower skin from the leading edge in chordwise direction for 2% or less of the local chord, and wherein the second flow surface portion is not micro-perforated and extends over the rest of the upper skin portion, and wherein the third flow surface portion is not micro-perforated and extends over the rest of the lower skin portion.

20 Claims, 9 Drawing Sheets

9
25
23
33
x
z
31
39
35
27
41
43

(56) References Cited

U.S. PATENT DOCUMENTS

| | | | | |
|---|---|---|---|---|
| 8,864,082 | B2 * | 10/2014 | Syassen | B64C 21/06 244/209 |
| 9,623,959 | B2 * | 4/2017 | Schrauf | B64C 21/06 |
| 10,974,817 | B2 * | 4/2021 | Heuer | B64C 21/025 |
| 2009/0212165 | A1 | 8/2009 | Parikh | |
| 2015/0191244 | A1 | 7/2015 | Rolston | |

FOREIGN PATENT DOCUMENTS

| | | |
|---|---|---|
| EP | 1 951 568 | 8/2008 |
| WO | 03/089295 | 10/2003 |
| WO | 2007/021480 | 2/2007 |
| WO | 2008/057065 | 5/2008 |

* cited by examiner

A-A

AIRCRAFT WING ASSEMBLY

RELATED APPLICATIONS

This application is the U.S. national phase of International Application PCT/EP2017/081422 filed Dec. 4, 2017, which designated the U.S. and claims priority to United Kingdom Patent Application GB 1620836.5 filed Dec. 7, 2016, the entire contents of each of which are incorporated by reference.

TECHNICAL FIELD

The present disclosure relates generally to an aircraft wing assembly having a leading edge and being designed to provide laminar flow over at least a portion of the aerodynamic surface. More particularly, embodiments of the present disclosure relate to an aircraft wing assembly having a slat with a leading edge and being designed to provide laminar flow over at least a portion of the slat.

BACKGROUND

As the major component of operating cost of a commercial aircraft is fuel and the major contributor to fuel consumption is aerodynamic drag, the reduction of aerodynamic drag is a prime goal in the design of aerodynamic surfaces of a commercial aircraft. Laminar boundary layer flow or, in short, laminar flow over an aerodynamic surface is generally associated with less drag than turbulent flow over that aerodynamic surface. Techniques to achieve laminar flow are typically categorised into: (i) natural laminar flow (NLF), which is established by aerodynamic shape and surface quality without requiring any active or powered device; (ii) active laminar flow (ALF), which requires an active or powered device to establish or maintain the laminar flow; and (iii) hybrid laminar flow (HLF), which can be a combination of NLF and ALF or include other ways of influencing or controlling the boundary layer. HLF also sometimes refers to a co-existence of laminar and turbulent flow regimes using techniques aiming for delaying an onset of a turbulent boundary layer by establishing and maintaining a certain laminar regime before the onset of a turbulent layer. A known mechanism to achieve a certain laminar regime is to dampen growth of small perturbations in the boundary layer by suction through micro perforations in the surface, thereby delaying the onset of boundary layer transition.

WO 03/089295 describes an outer skin of an aerodynamic body with perforations for laminar flow control through suctioning of boundary layer air.

EP 1 019 283 B1 describes an aircraft wing assembly with a high-lift portion, wherein at least a substantial part of an upper surface of said high-lift portion is air permeable or perforated.

These known solutions comprise suction chambers across most of the upper surface to control the pressure difference through the micro-perforations. Suction chambers add complexity and weight and make it more difficult to integrate ice-protection systems.

SUMMARY

Embodiments of the present disclosure provide an aircraft wing assembly having a laminar flow leading edge with less complexity and weight.

In accordance with a first aspect of the present disclosure, an aircraft wing assembly is provided comprising a main wing portion, a high-lift device comprising a flow surface with an upper skin portion and a lower skin portion, wherein the high-lift device is movable between a retracted position at the main wing portion and a deployed position defining a gap between the high-lift device and the main wing portion, wherein the main wing portion and the high-lift device in the retracted position define an airfoil having a local chord between a trailing edge and a leading edge, wherein the leading edge is on the flow surface of the high-lift device between the upper skin portion and the lower skin portion, wherein the flow surface of the high-lift device comprises a first flow surface portion, a second flow surface portion and a third flow surface portion, wherein the first flow surface portion is micro-perforated for an air inflow, wherein the first flow surface portion extends on the upper skin from the leading edge in chordwise direction for 2% or less of the local chord and extends on the lower skin from the leading edge in chordwise direction for 2% or less of the local chord, and wherein the second flow surface portion is not micro-perforated and extends over the rest of the upper skin portion, and wherein the third flow surface portion is not micro-perforated and extends over the rest of the lower skin portion.

The restriction of the micro-perforated first flow surface portion to 2% or less of the chord has shown to achieve a pressure difference through the micro-perforations that allows sufficient suctioning of boundary layer air without the use of suction chambers. Optionally, the micro-perforated first flow surface portion is restricted in both the upper and lower direction to 1% or less of the chord.

Herein, "micro-perforated" or "micro-perforations" shall denote a plurality of orifices distributed over a surface portion and having one or more sizes in the sub-millimetre range. Optionally, the shape of the micro-perforations of the first flow surface portion may be circular, slotted, oval or of any geometry that allows an air inflow. The size of the micro-perforations may be 20-100 μm, for instance 50 μm, with a relative distance of 100-1000 μm to each other, for instance 500 μm. The orientation, shape and/or size of the micro-perforations may be the same for all or they may gradually or non-gradually vary over the first flow surface portion or between sub-sections thereof.

Optionally, the high-lift device may comprise one or more outlets for an air outflow out of the high-lift device, wherein the outflow is substantially directed backward. Thereby, a pressure gradient between an ambient low pressure at the outlet and at the inner surface of the micro-perforated skin of the high-lift device sustains an airflow into the micro-perforations.

Optionally, at least one of the outlets may be located at a backward surface of the high-lift device. A high-lift device like a slat may comprise already ice protection system hot air exits on the backward surface that can function as an outlet, so that only minimal changes to the existing designs are needed.

Optionally, the backward surface of the high-lift device may comprise a seal between the main wing portion and the high-lift device in the retracted position, wherein the seal separates an upper backward surface portion of the backward surface from a lower backward surface portion of the backward surface, wherein at least one of the outlets is located at the lower backward surface portion. Optionally, all of the outlets are located at the lower backward surface portion. As air can flow from the lower backward surface portion to the lower wing surface and from the upper backward surface portion to the upper wing surface, the amount of airflow to the upper and lower wing surface can be controlled by the location of the outlets. With all outlets on the lower backward surface portion, the outflow is substantially directed towards the lower wing surface, and with all outlets on the upper backward surface portion, the outflow is substantially directed towards the upper wing surface. With at least one outlet at the lower backward surface portion and at least one outlet at the upper backward surface portion, the outflow may be split in a dedicated manner between the lower wing surface and the upper wing surface.

Optionally, at least one of the outlets may be located at the first flow surface portion, wherein said at least one of the outlets comprises a fairing at least partly shielding the outlet. Alternatively or in addition to that, at least one of the outlets is located at the third flow surface portion, wherein said at least one of the outlets comprises a fairing at least partly shielding the outlet. These options use the airflow around the first flow surface portion to achieve a lower ambient pressure at the outlet.

Optionally, the fairing may define a backward opening so that the outflow is substantially directed backward. This option facilitates an introduction of the outflow into the outer airflow with minimal induced drag.

Optionally, the backward opening may define an angle $\alpha$, optionally between 0 and 30 degrees, with respect to the design flow direction. For instance, the fairing may thus be configured to form at least partially a vortex generator for producing in flight at least one longitudinal vortex. The vortex passing the backward opening may further reduce the air pressure at the outlet. As an additional positive side effect for an outlet on the upper surface, the vortex may further be beneficial to energise the boundary layer to delay any boundary layer separation.

Optionally, the outlet may be controllable between a closed state and an opened state depending on a flight mode. For instance, the fairing may be movable between a retracted position in which the fairing smoothly blends with the lower skin portion for the closed state of the outlet and a deployed position in which the fairing protrudes out of the lower skin portion for the opened state of the outlet.

Optionally, the fairing may be spring loaded towards the retracted position and directly or indirectly opened by a retracting motion of the high-lift device towards the main wing portion.

Optionally, the outlet is flush with the flow surface and, optionally, the fairing may at least partly shield the outlet from inside the high-lift device. This configuration has the advantage that less parasitic drag is introduced.

Optionally, the fairing may be 3d-printed, i.e. manufactured by using an additive layer manufacturing (AM) technique such as selective laser melting (SLM), electron-beam melting (EBM), selective laser sintering (SLS), electron beam freeform fabrication (EBF), or other techniques suitable for manufacturing metal, composite or ceramic parts.

In accordance with a second aspect of the present disclosure, an aircraft is provided comprising an aircraft wing assembly described herein.

SUMMARY OF THE DRAWINGS

Embodiments of the present disclosure will now be described by way of example only with reference to the following figures of which.

DETAILED DESCRIPTION

Figure 1:
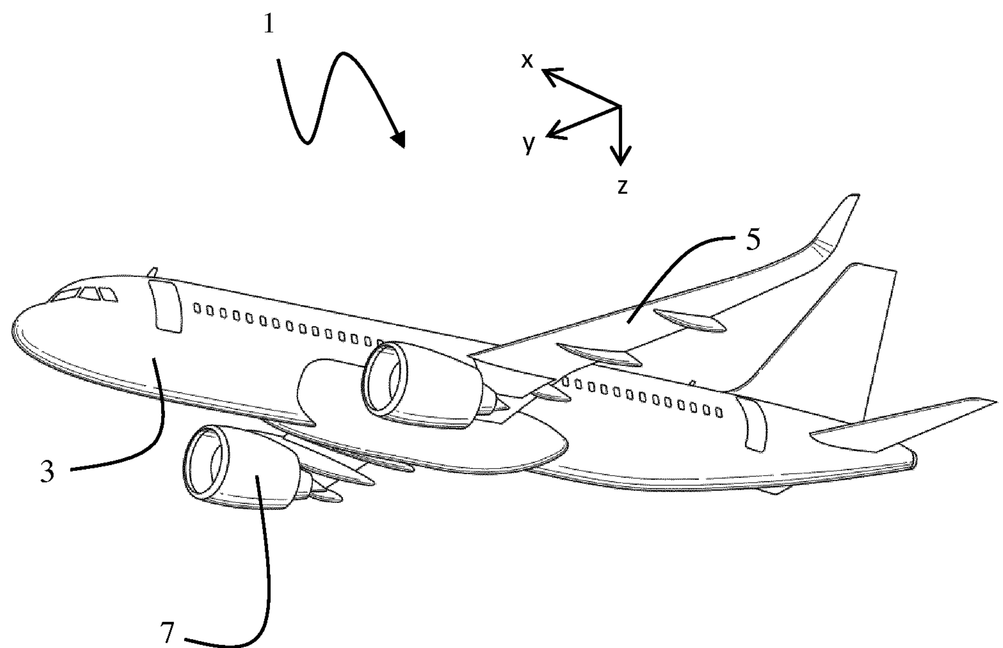
FIG. 1 is a schematic perspective view on an aircraft in accordance with the present disclosure.

FIG. 1 shows an aircraft 1 comprising a fuselage 3 and wings 5 to which engines 7 are attached. A right-handed Cartesian coordinate system shows a x-axis as the longitudinal aircraft axis, also known as roll axis, directed in the direction of flight; a y-axis as the lateral aircraft axis, also known as the pitch axis, essentially directed in spanwise direction of the wing 5 on the right-hand side of the aircraft 1; and a z-axis as the vertical aircraft axis, also known as the yaw axis, directed downward. This coordinate system is used throughout FIGS. 1-21, wherein the wing 5 on the right-hand side of the aircraft 1 is used to describe the present disclosure in detail. It will be readily understood by the reader that the present disclosure applies symmetrically for the wing 5 on the left-hand side of the aircraft 1.

Figure 2:
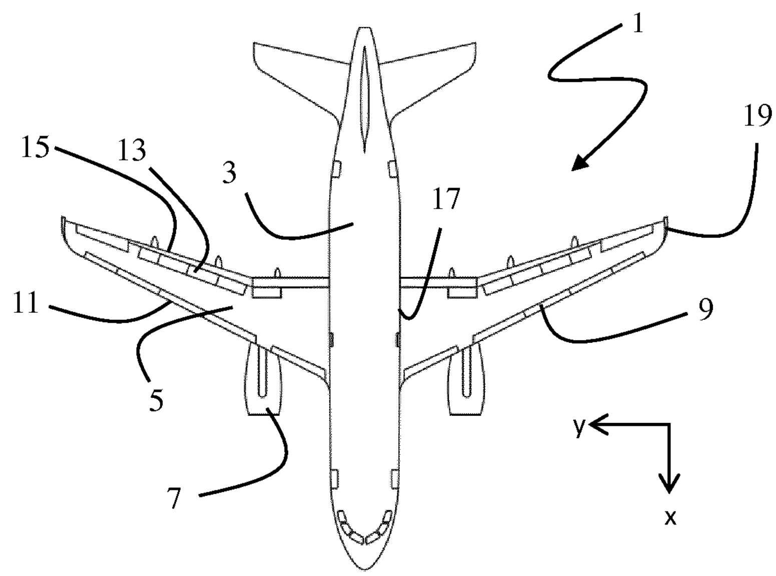
FIG. 2 is a top view on an aircraft in accordance with the present disclosure.

FIG. 2 shows a few more details of the wings 5 of the aircraft 1, for instance high-lift devices 9 at a leading edge 11 of the wings 5. Such leading edge high-lift devices 9 are also referred to as slats, which can be deployed to increase lift for during aircraft take-off and landing, and retracted during aircraft cruise to reduce drag. Other trailing edge high-lift devices 13, often referred to as flaps, are located at a wing trailing edge 15 have a similar purpose. The wings 5 extend from a wing root 17 attached to the fuselage 3 to a wing tip 19.

Figure 3:
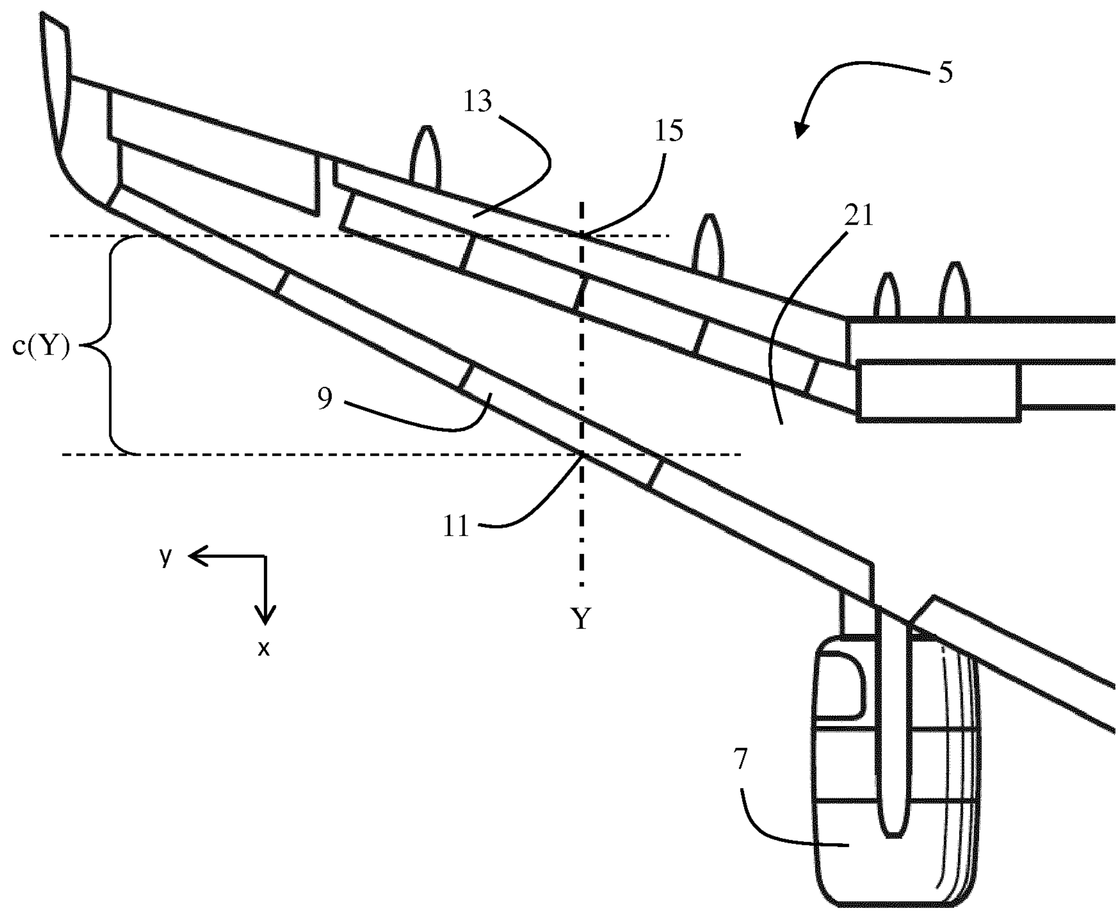
FIG. 3 is a top view on a wing assembly in accordance with the present disclosure.

FIG. 3 shows the right-handed wing 5 of the aircraft 1 comprising a wing assembly including a main wing portion 21, the leading edge high-lift devices 9 and the trailing edge high-lift devices 13. Depending on the lateral spanwise position along the y-axis, the wing leading edge 15 of the wing 5 may be defined by the trailing edge high-lift devices 13, the main wing portion 21, or other control surfaces like ailerons or spoilers. In FIG. 3, the lateral position Y in spanwise direction along the y-axis is arbitrarily chosen to show the local chord c(Y) between the leading edge 11 and the wing trailing edge 15 at position Y. The local chord c(y) is in general a length dependent on the lateral position y in spanwise direction along the y-axis. The chord is to be understood as a feature of the wing airfoil in cruise, i.e. the direct distance between the leading edge 11 and the wing trailing edge 15 in the xz-plane when high-lift devices 9 and 13 are retracted.

Figure 4:
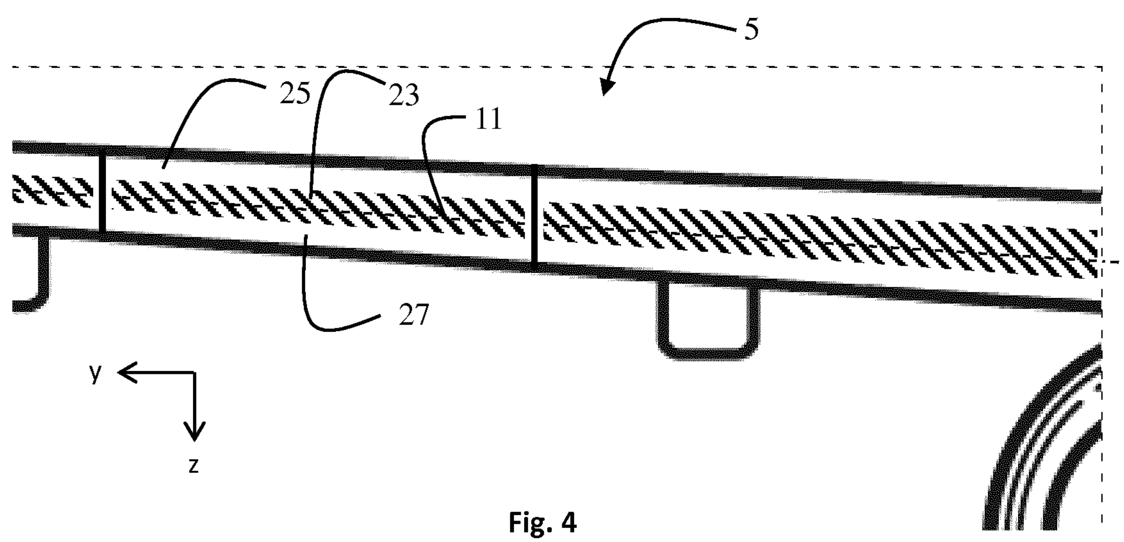
FIG. 4 is a front partial view on a wing assembly in accordance with the present disclosure.

FIG. 4 schematically shows a front view on the leading edge 11 of the wing 5 having a flow surface with a first flow surface portion 23 (displayed hatched in FIG. 4), a second flow surface portion 25 above the first flow surface portion 23 and a third flow surface portion 27 below the first flow surface portion 23. The first flow surface portion 23 is micro-perforated to allow for an air inflow, whereas both the second flow surface portion 25 and the third flow surface portion 27 are not micro-perforated to allow for an air inflow. Herein, the leading edge 11 defines the border between an upper skin portion and a lower skin portion of the leading edge high-lift device 9, so that the second flow surface portion 25 is part of the upper skin portion and the third flow surface portion 27 is part of the lower skin portion. The first flow surface portion 23 is part of both the upper skin portion and the lower skin portion.

Figure 5:
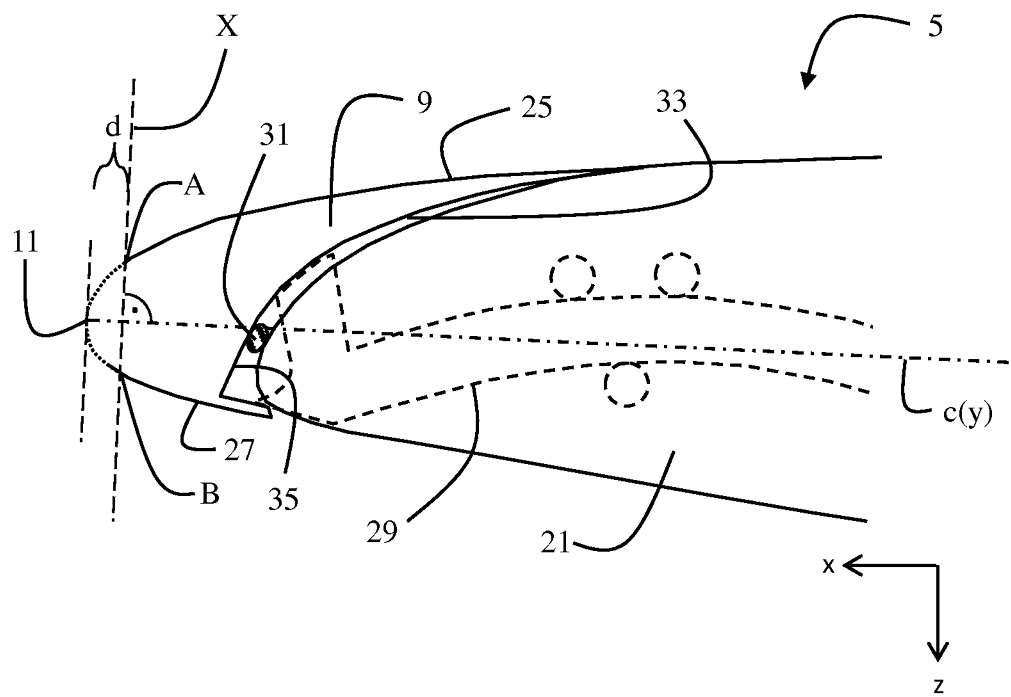
FIG. 5 is a cross-sectional view on a leading edge portion of a wing assembly in accordance with the present disclosure, wherein a leading edge high-lift device is in a retracted position.

FIG. 5 is a detailed cross-sectional view on the forward portion of wing 5, wherein the leading edge high-lift device 9, also referred to as a slat, is in a retracted position close to the main wing portion 21. The leading edge high-lift device 9 is movably coupled to the main wing portion 21 via an actuation system 29. The actuation system 29 is displayed as a rail system (dashed), but it may be any type of linkage system that allows the leading edge high-lift device 9 to be moved between a retracted cruise position and a deployed high-lift position for take-off and landing. A seal 31 is located on a backward surface of the high-lift device 9 providing a sealing contact between the high-lift device 9 and the main wing portion 21 in the retracted position. The seal 31 thereby separates an upper backward surface portion 33 of the backward surface from a lower backward surface portion 35 of the backward surface of the high-lift device 9.

Figure 6:
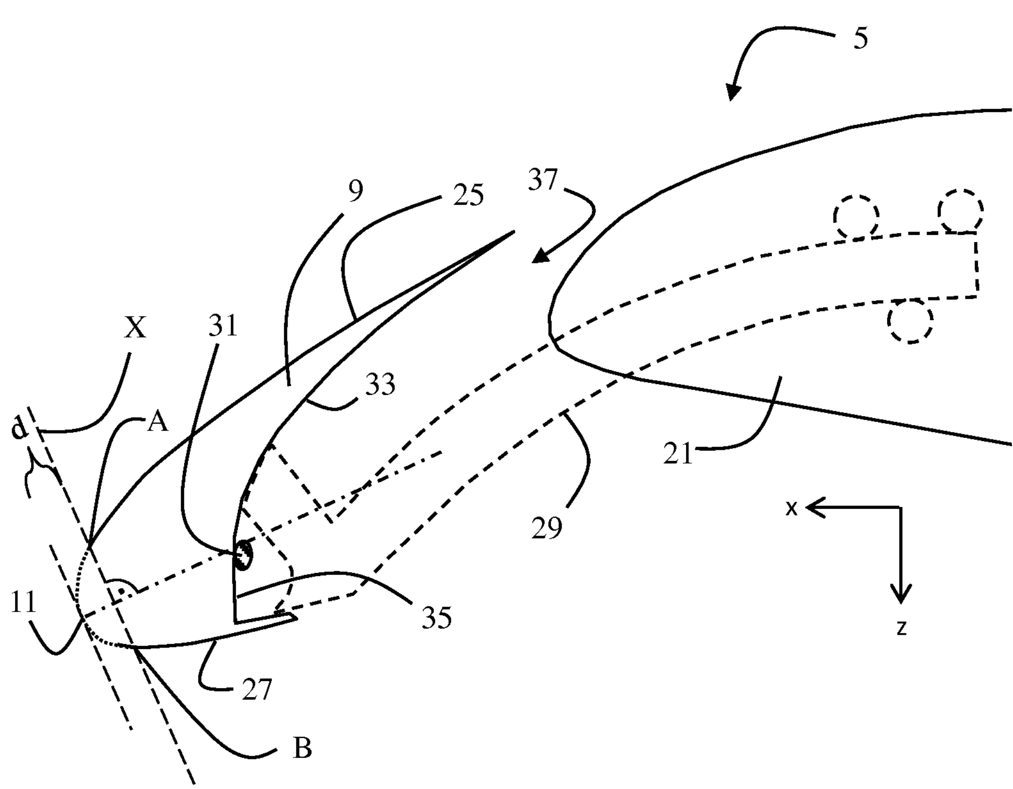
FIG. 6 is a cross-sectional view on a leading edge portion of a wing assembly in accordance with the present disclosure, wherein a leading edge high-lift device is in a deployed position.

FIG. 6 is a detailed cross-sectional view on the forward portion of wing 5, wherein the leading edge high-lift device 9 is in a fully deployed position defining a gap 37 between the leading edge high-lift device 9 and the main wing portion 21. It should be noted that the leading edge 11 is defined in the retracted position (FIG. 5) with a local chord c(y) between the leading edge 11 and the wing trailing edge 15 (not shown in FIGS. 5 and 6) in the xz-plane. Herein, the leading edge 11 and local chord c(y) are understood to be fixed wing assembly design features that do not change between the retracted position (FIG. 5) and the deployed position (FIG. 6).

FIGS. 5 and 6 illustrate the maximal limits of the extension of the micro-perforated first flow surface portion 23. The local chord c(y) is perpendicular to a plane X intersecting the displayed airfoil at a distance d of 2% of the local chord c(y) from the leading edge 11. The plane X defines an upper intersection line A and a lower intersection line B with the flow surface of the high-lift device 9. The micro-perforated first flow surface portion 23 (displayed as dashed in FIGS. 5 and 6) extends within the limits of upper intersection line A and lower intersection line B. It should be noted that the micro-perforated first flow surface portion 23 may extend over less than the full area between upper intersection line A and lower intersection line B, because this area is to be understood as a maximal limit for the extension of micro-perforated first flow surface portion 23. In the example shown in FIGS. 5 and 6, the micro-perforated first flow surface portion 23 extends on the upper surface portion fully up to upper intersection line A, but the micro-perforated first flow surface portion 23 does not extend on the lower surface portion fully up to lower intersection line B. Other options may be that the first flow surface portion 23 extends fully up both to the upper intersection line A and the lower intersection line B, or that the first flow surface portion 23 does not extend fully up to either the upper intersection line A or the lower intersection line B, or that the first flow surface portion 23 does extend fully up to either the lower intersection line B, but not to the upper intersection line A.

Figure 7:
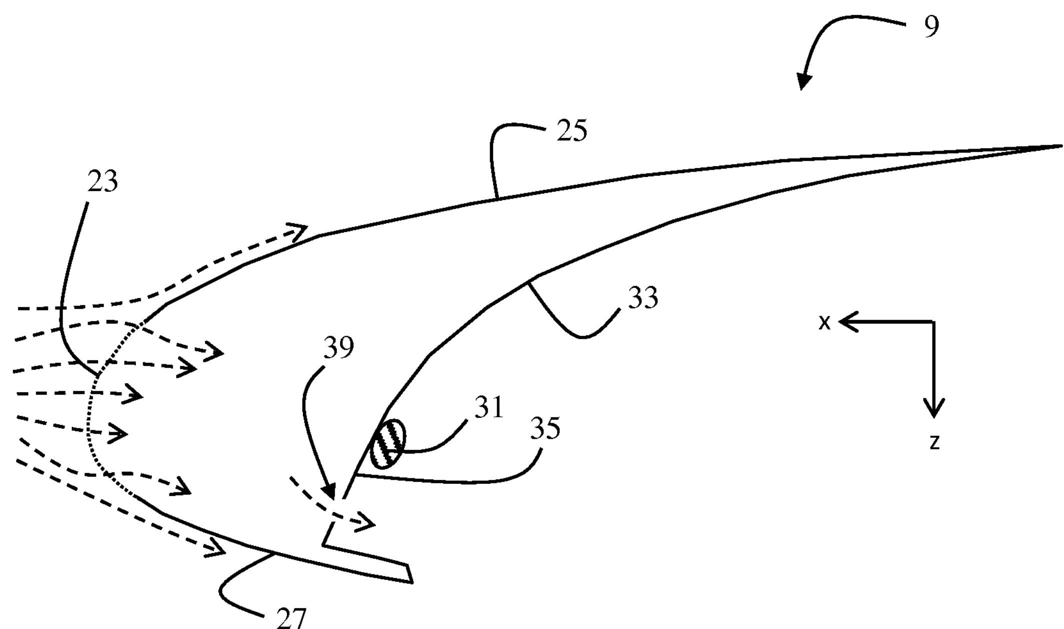
FIG. 7 is a cross-sectional view on a high-lift device of a wing assembly in accordance with the present disclosure, wherein an outlet is located at a backward surface of the high-lift device.
Figure 8:
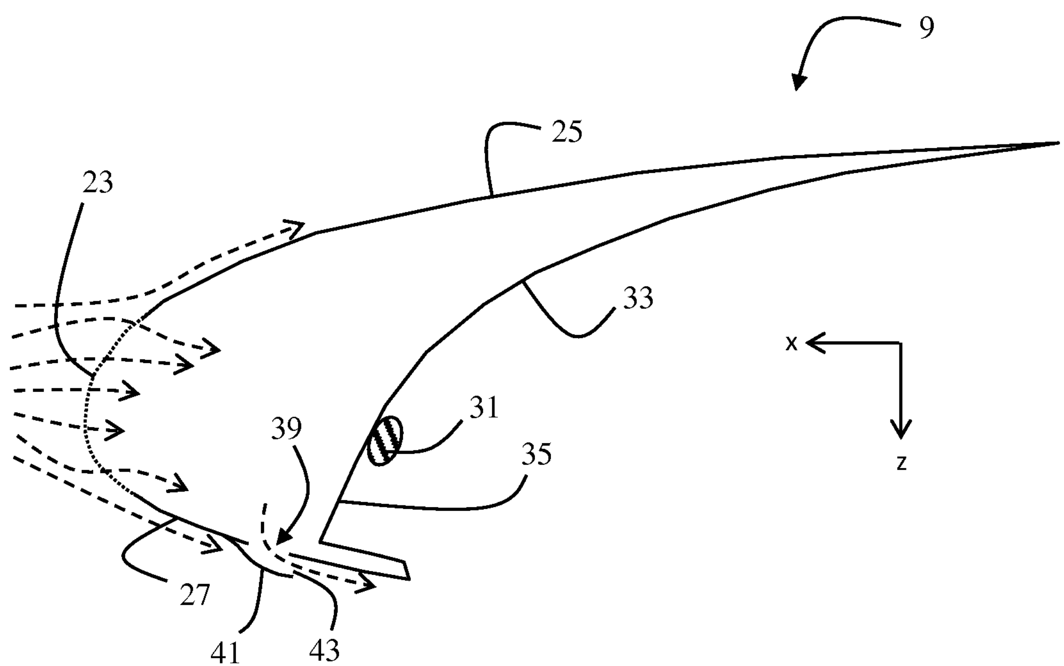
FIG. 8 is a cross-sectional view on a leading edge portion of a wing assembly in accordance with the present disclosure, wherein an outlet is located at a lower surface of the high-lift device.

FIGS. 7 and 8 show a cross-sectional view of the high-lift device 9 only during flight in cruise mode. Dashed arrows indicate an airflow relative to the high-lift device 9 when it flies. Part of the airflow hitting the micro-perforated first flow surface portion 23 enters the high-lift device 9 through the micro-perforations in the first flow surface portion 23, because the air pressure within the high-lift device 9 is below the air pressure at the first flow surface portion 23. In FIG. 7, an outlet 39 is provided at the lower backward surface portion 35 of the backward surface of the high-lift device 9. The outlet 39 may be one of a plurality of outlets provided at the high-lift device 9. The plurality of outlets may be aligned with a distance to each other in substantially spanwise direction along the y-axis or in any other configuration. The figures only show one outlet 39 as an example of the plurality of outlets, but it should be understood that the other outlets that are not shown can have the same, a similar or a different size, design, orientation, or arrangement than the shown outlet 39.

The ambient air pressure at the outlet 39 is lower than the air pressure within the high-lift device 9 so that air is flowing out of the high-lift device 9. Thereby, the air pressure within the high-lift device 9 is maintained below the air pressure of the boundary layer at the first flow surface portion 23 to achieve a constant suction of parts of the boundary layer airflow around the leading edge 11 into the high-lift device 9. The outlet 39 can be a drainage hole or a dedicated air outlet with a size and form designed to achieve a desired airflow out of the high-lift device 9. The outlet 39 in FIG. 7 does not significantly introduce parasitic drag.

In FIG. 8, the outlet 39 is located at the lower skin portion of the high-lift device 9. More particular, it is located at the non-perforated third flow surface portion 27 of the high-lift device 9. The outlet 39 comprises a fairing 41 at least partly shielding the outlet 39 from outside the high-lift device, wherein the fairing 41 defines a backward opening 43 so that the outflow is substantially directed backward. In this configuration, the ambient airflow may provide a lower dynamic pressure at the backward opening 43 to achieve a higher outflow. The higher outflow may reduce the air pressure within the high-lift device 9 to achieve a stronger suction effect on the boundary layer airflow around the leading edge. The fairing 41 may be aerodynamically designed to cause only a minimum of parasitic drag. The suctioning of boundary layer airflow around the leading edge may delay boundary layer transition from laminar to turbulent airflow, which means that substantially larger surface portions of the high-lift device 9 produce less viscous drag. This drag reduction over-compensates the penalty of parasitic drag introduced by the fairing 41.

Figure 9:
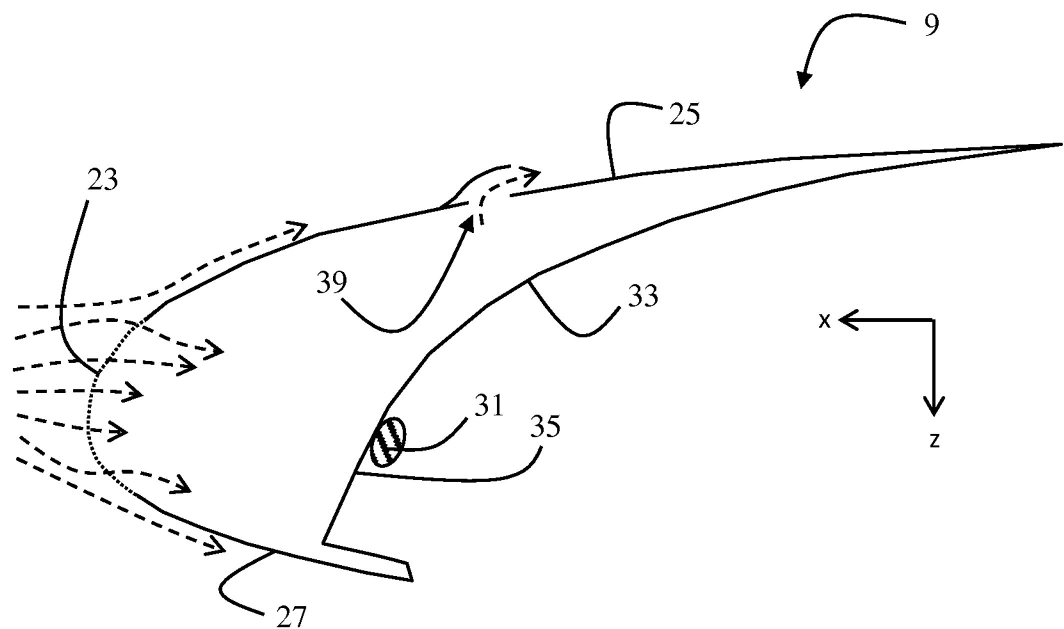
FIG. 9 is a cross-sectional view on a leading edge portion of a wing assembly in accordance with the present disclosure, wherein an outlet is located at an upper surface of the high-lift device.
Figure 10:
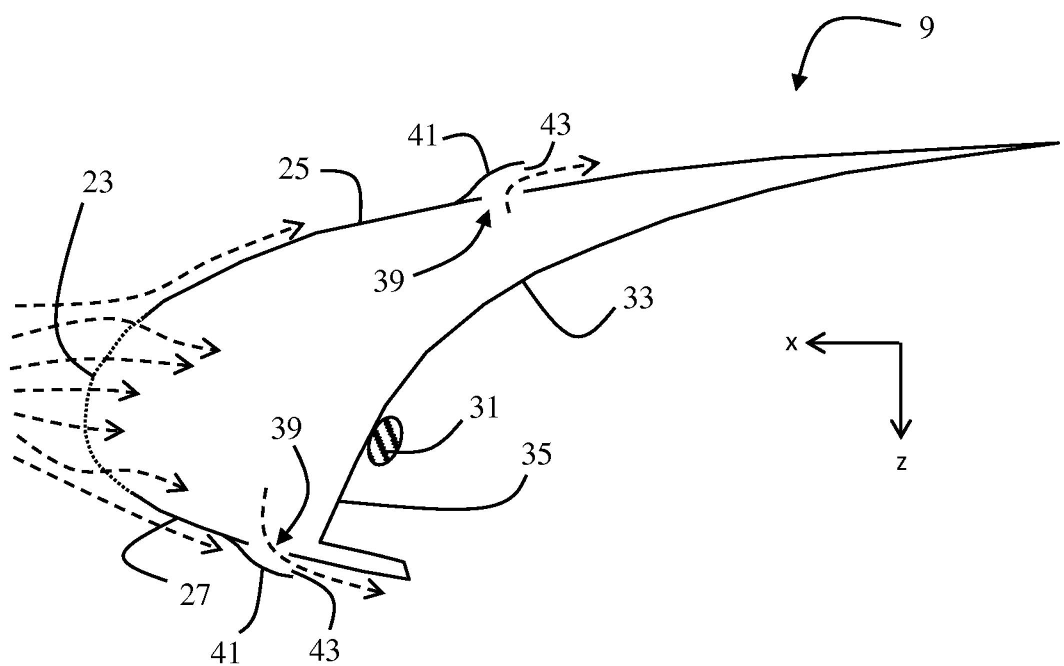
FIG. 10 is a cross-sectional view on a leading edge portion of a wing assembly in accordance with the present disclosure, wherein an outlet is located at an upper and lower surface of the high-lift device.

FIGS. 9 and 10 show examples where the outlet 39 is located on the upper skin portion at the non-perforated second flow surface portion 25 of the high-lift device 9, as an alternative to the outlet 9 at the lower skin portion (FIG. 9) or in addition to it (FIG. 10). It may also be combined with an outlet 39 at the backward surface of the high-lift device 9 (see FIG. 7). With an additional positive side effect, the upper outlet 39 may be used to function as a vortex generator for energising the boundary layer flow to further delay the onset of boundary layer separation behind the outlet 39.

Figure 11:
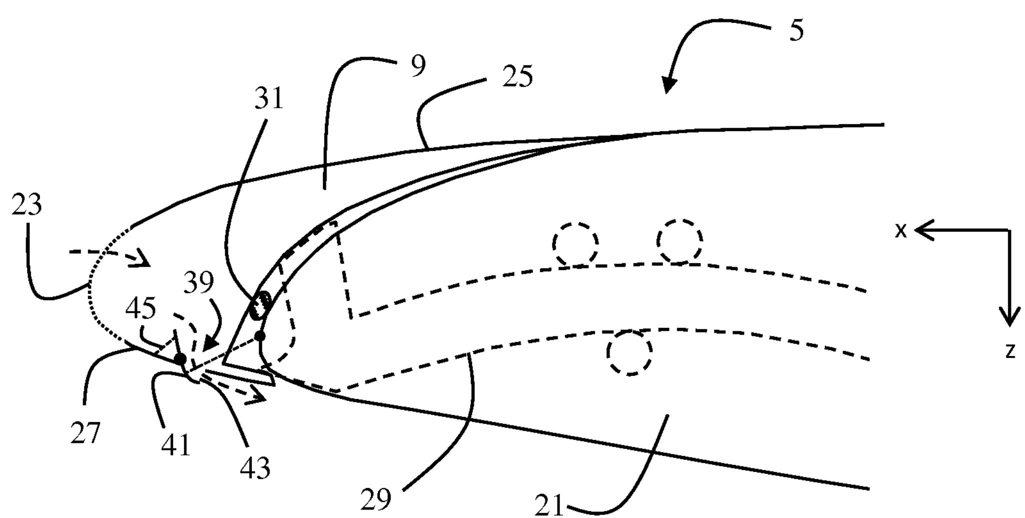
FIG. 11 is a cross-sectional view on a leading edge portion of a wing assembly in accordance with the present disclosure, wherein a leading edge high-lift device is in a retracted position, and wherein an outlet is at least shielded by a movable fairing in an opened position.
Figure 12:
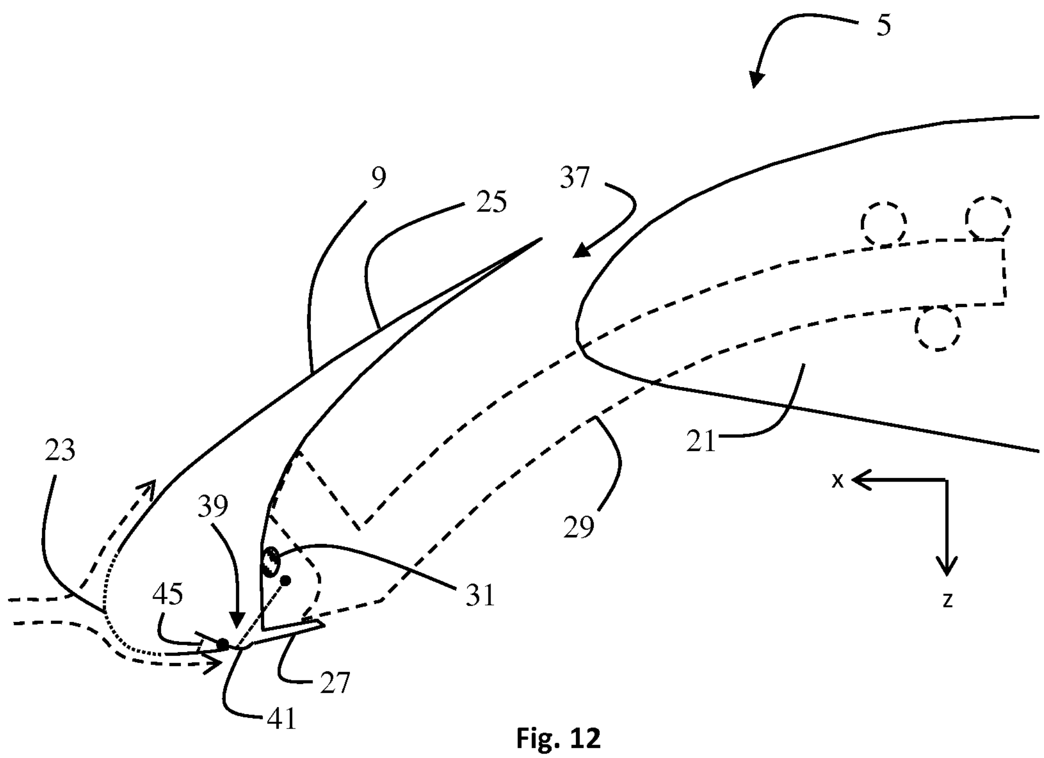
FIG. 12 is a cross-sectional view on a leading edge portion of a wing assembly in accordance with the present disclosure, wherein a leading edge high-lift device is in a deployed position, and wherein a lower surface outlet is at least partly shielded by a movable fairing in a closed position.

In FIGS. 11 and 12, the outlet 39 is controllable between a closed state (FIG. 12) and an opened state (FIG. 11) depending on the flight mode. The fairing 41 is movable between a retracted position (FIG. 12) in which the fairing smoothly blends with the lower skin portion for the closed state of the outlet 39 and a deployed position (FIG. 11) in which the fairing 41 protrudes out of the lower skin portion for the opened state of the outlet 39. In this example, the fairing 41 is hinged and spring loaded towards the retracted position by a spring 45. The fairing 41 can be pushed open against the force of the spring 45 into the deployed position by a mechanical link touching the main wing portion 21 when the high-lift device 9 is fully retracted. Another option of actuating the fairing 41 into the deployed position may be through the use of a controllable solenoid. The fully retracted position of the high-lift device 9 may trigger directly through a mechanical link, or indirectly by means of a sensor or other available slat position information the outlet 39 to open. Optionally, the outlet 39 may be controlled by the pilot or avionics software independently of the positon of the high-lift device 9.

The fairing 41 in a retracted position introduces less parasitic drag than in the deployed position. For instance in take-off and landing flight modes, the fairing 41 may be retracted to save parasitic drag, and may then be deployed in cruise flight mode when the benefit of a delayed turbulent flow over-compensates the parasitic drag introduced by the deployed fairing 41.

Figure 13:
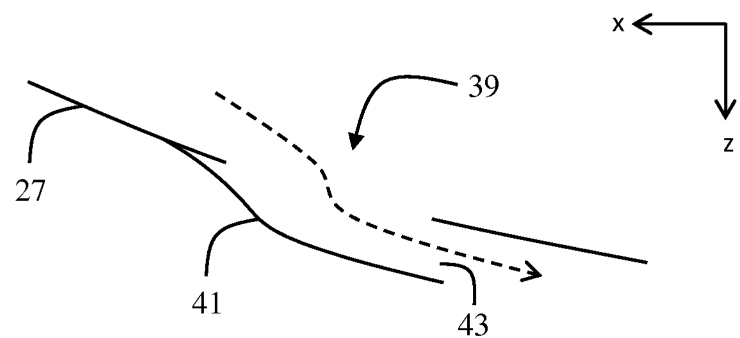
FIG. 13 is a cross-sectional view of a lower surface outlet of a leading edge portion of a wing assembly in accordance with the present disclosure.
Figure 14:
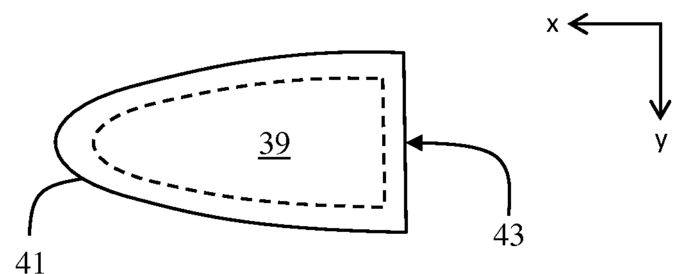
FIG. 14 is a top view of a lower surface outlet of a leading edge portion of a wing assembly in accordance with the present disclosure.
Figure 15:
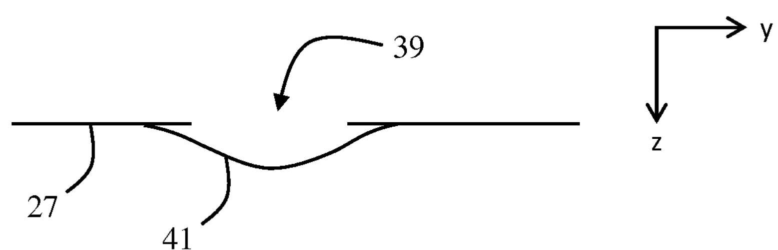
FIG. 15 is a back view of a lower surface outlet of a leading edge portion of a wing assembly in accordance with the present disclosure.

FIGS. 13, 14 and 15 show three different detailed views on a first design option of an outlet 39 at the third flow surface portion 27 (as in FIG. 8). The fairing 41 has an aerodynamically optimised shape to keep the drag penalty introduced by the fairing 41 at a minimum. The pressure differential between the inner volume of the high-lift device 9 and the air pressure at the backward opening 43 causes a constant airflow out of the outlet 39. The airflow out of the backward opening 41 is substantially directed backward and mixes with the ambient airflow during flight.

Figure 16:
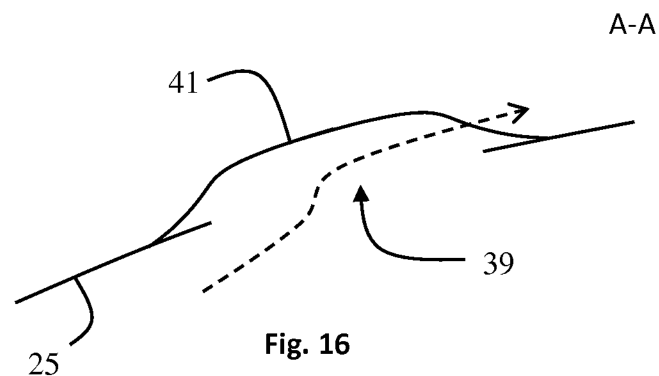
FIG. 16 is a cross-sectional view of an upper surface outlet of a leading edge portion of a wing assembly in accordance with the present disclosure.
Figure 17:
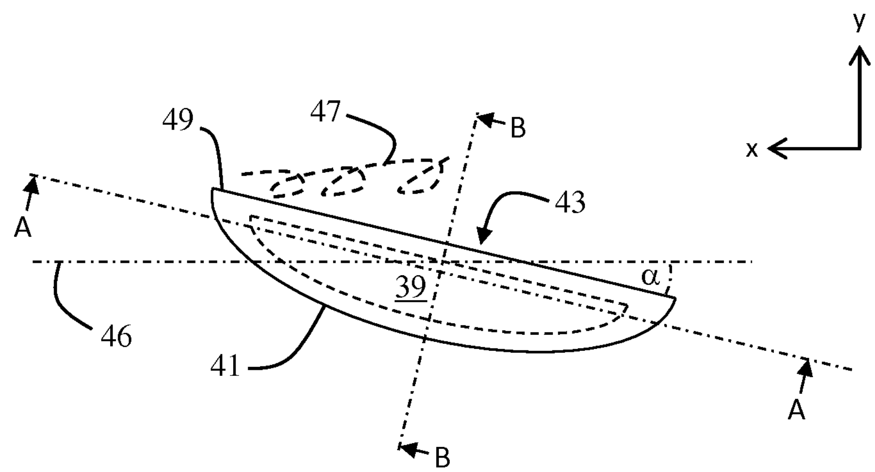
FIG. 17 is a top view of an upper surface outlet of a leading edge portion of a wing assembly in accordance with the present disclosure.
Figure 18:
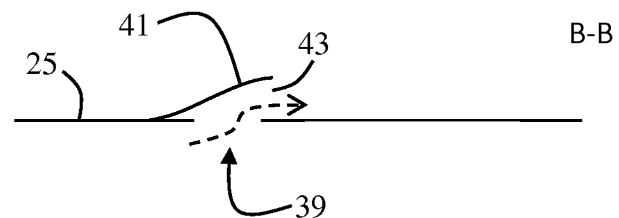
FIG. 18 is a back view of an upper surface outlet of a leading edge portion of a wing assembly in accordance with the present disclosure.

FIGS. 16, 17 and 18 show three different detailed views on a second design option of an outlet 39 at the second flow surface portion 25 (as in FIG. 9). The backward opening 43 defines an angle $\alpha$ with respect to a design flow direction 46 along the x-axis. On a swept wing, the design flow direction can be locally different from the chordwise direction depending on the spanwise and chordwise location. In FIG. 17, however, the design flow direction 46 is in line with the chordwise direction along the x-axis. If, locally, the design flow direction 46 is not in line with the chordwise direction, the backward opening 43 may define another or no angle with respect to the chordwise direction, while the angle $\alpha$ with respect to the design flow direction 46 may have a value of up to 30 degrees. This oblique arrangement of the fairing 41 generates a defined vortex 47 initiating from a forward edge 49 of the fairing 41 and passing along the backward opening 43. The vortex 47 further reduces the air pressure at the backward opening 43 and thus enhances the suctioning effect. As an additional side effect on the upper skin portion, the vortex 47 may delay any boundary layer separation behind the outlet by energising the boundary layer.

Figure 19:
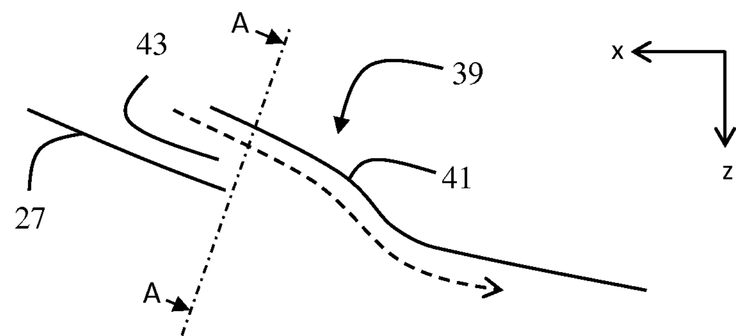
FIG. 19 is a cross-sectional view of a lower surface outlet of a leading edge portion of a wing assembly in accordance with the present disclosure, wherein the outlet is flush with the flow surface.
Figure 20:
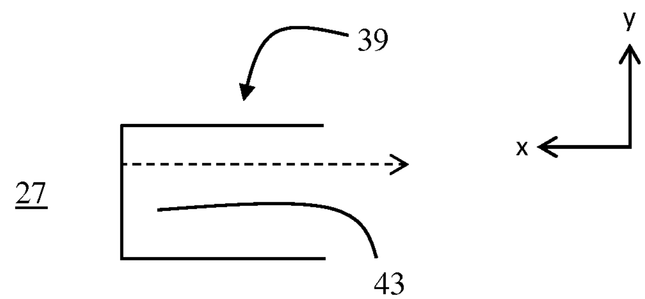
FIG. 20 is a top view of a lower surface outlet of a leading edge portion of a wing assembly in accordance with the present disclosure, wherein the outlet is flush with the flow surface.
Figure 21:
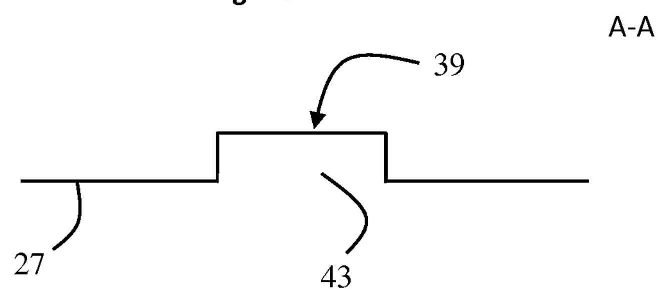
FIG. 21 is a back view of a lower surface outlet of a leading edge portion of a wing assembly in accordance with the present disclosure, wherein the outlet is flush with the flow surface.

FIGS. 19, 20 and 21 show three different detailed views on a third design option of an outlet 39 at the third flow surface portion 27. Here, the fairing 41 at least partly shields the outlet 39 from within the high-lift device so that the outlet 39 is essentially flush with the lower skin portion. The fairing 41 may smoothly blend into the lower skin portion and/or be a part thereof. The backward opening 43 is thus located within the high-lift device to facilitate a substantially backward airflow out of the outlet 39. This design option has the advantage that the flush outlet 39 introduces less parasitic drag than the protruding outlet 39.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as optional, preferable, advantageous, convenient or the like are optional and do not limit the scope of the independent claims.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. It should be understood that there should be embodied within the scope of the patent warranted hereon all such modifications as reasonably and properly come within the scope of the contribution to the art. Such modifications, substitutions and alternatives can be made without departing from the spirit and scope of the invention, which should be determined from the appended claims and their legal equivalents.

REFERENCE NUMERALS

1 aircraft
3 fuselage
5 wing
7 engine
9 leading edge high-lift device
11 leading edge
13 trailing edge high-lift device
15 trailing edge
17 wing root
19 wing tip
21 main wing
23 first flow surface portion
25 second flow surface portion
27 third flow surface portion
29 actuation system
31 seal
33 upper backward surface portion
35 lower backward surface portion
37 gap
39 outlet
41 fairing
43 backward opening
45 spring
46 design flow direction
47 vortex
49 forward edge

The invention claimed is:

1. An aircraft wing assembly comprising a main wing portion, a high-lift device comprising a flow surface with an upper skin portion and a lower skin portion, wherein the high-lift device is movable between a retracted position at the main wing portion and a deployed position defining a gap between the high-lift device and the main wing portion, wherein the main wing portion and the high-lift device in the retracted position define an airfoil having a local chord between a trailing edge and a leading edge, wherein the leading edge is on the flow surface of the high-lift device between the upper skin portion and the lower skin portion, wherein the flow surface of the high-lift device comprises a first flow surface portion, a second flow surface portion and a third flow surface portion, wherein the first flow surface portion is micro-perforated and configured for air inflow, wherein the first flow surface portion extends on the upper skin from the leading edge in a chordwise direction for 2% or less of the local chord and extends on the lower skin from the leading edge in the chordwise direction for 2% or less of the local chord, wherein the second flow surface portion is not micro-perforated and extends over the rest of the upper skin portion, and wherein the third flow surface portion is not micro-perforated and extends over the rest of the lower skin portion.

2. The aircraft wing assembly according to claim 1, wherein the high-lift device comprises one or more outlets for an air outflow out of the high-lift device, wherein the outflow is substantially directed backward.

3. The aircraft wing assembly according to claim 2, wherein at least one of the outlets is located at a backward surface of the high-lift device.

4. The aircraft wing assembly according to claim 3, wherein the backward surface of the high-lift device comprises an upper backward surface portion and a lower backward surface portion, wherein a seal between the main wing portion and the high-lift device in the retracted position separates the upper backward surface portion from the lower backward surface portion, wherein at least one of the outlets is located at the lower backward surface portion.

5. The aircraft wing assembly according to claim 2, wherein at least one of the one or more outlets is located at the second flow surface portion, wherein said at least one of the outlets comprises a fairing at least partly shielding the at least one of the outlets.

6. The aircraft wing assembly according to claim 2, wherein at least one of the one or more outlets is located at the third flow surface portion, wherein said at least one of the outlets comprises a fairing at least partly shielding the outlet.

7. The aircraft wing assembly according to claim 5, wherein the fairing defines a backward opening so that the outflow is substantially directed backward.

8. The aircraft wing assembly according to claim 7, wherein the backward opening defines an angle $\alpha$ with respect to the design flow direction.

9. The aircraft wing assembly according to claim 5, wherein the outlet is controllable between a closed state and an opened state depending on a flight mode.

10. The aircraft wing assembly according to claim 6, wherein the fairing is movable between a retracted position in which the fairing smoothly blends with the lower skin portion for the closed state of the one or more outlets, and a deployed position in which the fairing protrudes out of the lower skin portion for the opened state of the outlet.

11. The aircraft wing assembly according to claim 5, wherein the fairing is configured to form at least partially a vortex generator for producing in flight at least one longitudinal vortex.

12. The aircraft wing assembly according to claim 7, wherein the outlet is flush with the flow surface.

13. The aircraft wing assembly according to claim 12, wherein the fairing at least partly shields the outlet from inside the high-lift device.

14. The aircraft wing assembly according to claim 6, wherein the fairing defines a backward opening so that the outflow is substantially directed backward.

15. The aircraft wing assembly according to claim 14, wherein the backward opening defines an angle $\alpha$ with respect to the design flow direction.

16. The aircraft wing assembly according to claim 6, wherein the outlet is controllable between a closed state and an opened state depending on a flight mode.

17. The aircraft wing assembly according to claim 10, wherein the fairing is moveable between a retracted position in which the fairing smoothly blends with the lower skin portion for the closed state of the outlet and a deployed position in which the fairing protrudes out of the lower skin portion for the opened state of the outlet.

18. The aircraft wing assembly according to claim 6, wherein the fairing is configured to form at least partially a vortex generator for producing in flight at least one longitudinal vortex.

19. An aircraft wing assembly comprising a main wing portion, a high-lift device comprising a flow surface with an upper skin portion and a lower skin portion, wherein the high-lift device is movable between a retracted position at the main wing portion and a deployed position defining a gap between the high-lift device and the main wing portion, wherein the main wing portion and the high-lift device in the retracted position define an airfoil having a local chord between a trailing edge and a leading edge, wherein the leading edge is on the flow surface of the high-lift device between the upper skin portion and the lower skin portion, wherein the flow surface of the high-lift device comprises a first flow surface portion, a second flow surface portion and a third flow surface portion, wherein the first flow surface portion is micro-perforated and configured for air inflow, wherein the first flow surface portion extends on the upper skin from the leading edge in a chordwise direction for 2% or less of the local chord and extends on the lower skin from the leading edge in the chordwise direction for 2% or less of the local chord, wherein the second flow surface portion is not micro-perforated and extends over the rest of the upper skin portion, wherein the third flow surface portion is not micro-perforated and extends over the rest of the lower skin portion, wherein at least one of the one or more outlets is located at the third flow surface portion, wherein said at least one of the outlets comprises a fairing at least partly shielding the at least one of the outlets, wherein the fairing is movable between a retracted position in which the fairing smoothly blends with the lower skin portion for the closed state of the one or more outlets, and a deployed position in which the fairing protrudes out of the lower skin portion for the opened state of the outlet, and wherein the fairing is spring loaded towards the retracted position, and directly or indirectly opened by a retracting motion of the high-lift device towards the main wing portion.

20. An aircraft comprising an aircraft wing assembly according to claim 1.

* * * * *